(12) United States Patent
Wiegert (10) Patent No.: US 6,888,353 B1
(45) Date of Patent: May 3, 2005

(54) MAGNETIC ANOMALY HOMING SYSTEM AND METHOD USING MAGNETIC TOTAL FIELD SCALARS

(75) Inventor: Roy Wiegert, Panama City, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/932,652

(22) Filed: Aug. 30, 2004

(51) Int. Cl.[7] .................................................. G01V 3/08
(52) U.S. Cl. ...................... 324/345; 324/244; 324/260
(58) Field of Search ............................... 324/326, 345, 324/242–243, 244–245, 251–260; 33/355 R (56) References Cited

U.S. PATENT DOCUMENTS 6,476,610 B1 * 11/2002 Wiegert et al. ............ 324/345

* cited by examiner

Primary Examiner—Bot LeDynh
(74) Attorney, Agent, or Firm—James T. Shepherd (57) ABSTRACT

A magnetic anomaly homing system uses an array of magnetic sensors coupled to a non-magnetic platform. The array is defined by a plurality of single-axis subsystems with each one thereof having two magnetic sensors spaced apart from one another. A processor coupled to the magnetic sensors generates a plurality of magnetic total field scalars that can be used to directly home in on a magnetic object from both long and short-range distances to the target. The scalars define guidance control parameters used to steer the platform to align the platforms's direction of motion with the magnetic anomaly.

15 Claims, 4 Drawing Sheets

MAGNETIC ANOMALY HOMING SYSTEM AND METHOD USING MAGNETIC TOTAL FIELD SCALARS

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to magnetic homing systems and methods, and more particularly to a magnetic anomaly homing system and method that, from a relatively long range, can use magnetic total field scalars to directly home in on a magnetic object.

BACKGROUND OF THE INVENTION

In general, mobile magnetic sensors must discriminate the relatively very small DC vector magnetic anomaly fields that emanate from magnetically polarized targets while the sensor's platform motion in the large magnetic field of Earth can cause large non-target-related changes in vector field measurements. The large, non-target-related changes in measured field components can overwhelm the relatively small target fields (or, "signatures") and greatly reduce the effective target detection range of vector magnetometers. Consequently, mobile magnetic sensing applications have generally required the use of sensors that either measure the scalar magnitude of the magnetic field (i.e., "scalar total field magnetometers") or measure the spatial gradients of field (i.e., "tensor gradiometers" that measure the rate of change of the magnetic field with distance). While scalar magnetometers provide relatively long target detection range, they have relatively poor target localization or homing capabilities. On the other hand, tensor gradiometers can provide very good target localization capabilities at the expense of target detection range.

Since scalar total field magnetometers are minimally affected by changes in sensing platform orientation, they have a long history of use in mobile magnetic sensing applications such as aerial geological surveys and antisubmarine warfare. Aerial applications typically involve the use of single scalar magnetometers that are either towed below the aircraft or mounted in a "stinger" located behind the tail of the aircraft. In addition, single sensors or arrays of two or three scalar magnetometers are commonly towed behind water vessels to search for smaller targets such as underwater and buried mines. For aerial and maritime applications, the scalar total field magnetometers generally require multiple passes over a target region (with the targets usually located below the sensor platform) in order to approximately "map out" the location of a target. For example a commercially available product by Marine Magnetics, Inc., Ontario, Canada, uses an array of three scalar magnetometers in a multi-pass "raster scan" search modality to localize and classify magnetic targets. However, multi-pass target-mapping modalities are not efficient for autonomous sensing platforms equipped with limited power capabilities. That is, a small autonomous vehicle's magnetic sensor system must be able to directly guide the vehicle so that it can directly home in on a target. However, the following specific characteristics of scalar total field sensors and the total magnetic field have heretofore impeded the use of total field sensors for directly homing in on magnetic targets:

(i) The magnitude of total field that surrounds a magnetic anomaly is a complex function of sensor-target distance and target orientation relative to the Earth's magnetic field. In particular, in some regions around a given target, the total field may decrease as a sensor moves closer to the target while in other regions around the same target the total field may increase as sensor-target distance decreases. Therefore, total field data heretofore have not provided a robust basis for homing in on magnetic targets. Here, the term "robust" is defined to mean a magnetic quantity or parameter whose value always behaves in a well defined way, namely, a robust quantity always increases as sensor-target distance decreases and decreases as sensor-target distance increases.

(ii) Scalar magnetometers essentially only measure the component of magnetic anomaly field that is parallel to the Earth's background field. Since they do not measure the full complement of target localization information that is implicit in the vector magnetic anomaly field, they normally require multiple passes of the sensor over a target region in order to map out an approximate localization of a target.

In summary, prior art approaches to magnetic anomaly guidance either have used relatively long-range, total-field sensor arrangements that lack direct target homing capability, or they have used magnetic gradiometers with good guidance capabilities but with a relatively short target detection range in comparison to the total field approach.

SUMMARY OF THE INVENTION

Accordingly, it is an object of the present invention to provide a magnetic anomaly homing system and method that can be used to directly home in on magnetic objects from relatively long ranges.

Another object of the present invention is to provide a magnetic homing system and method that will allow autonomous unmanned vehicles to more efficiently home in on magnetic objects.

A further object of the present invention is to provide a system and method whereby scalar magnetometers can be used for magnetic anomaly guidance of autonomous vehicles.

Other objects and advantages of the present invention will become more obvious hereinafter in the specification and drawings.

In accordance with the present invention, a magnetic anomaly homing system includes an array of magnetic sensors coupled to a non-magnetic platform. The sensors are arranged to define a left half and right half of the array relative to a direction of motion of the platform. The array is defined by a plurality of single-axis subsystems with each one thereof having two magnetic sensors spaced apart from one another. The single-axis subsystems include at least first and second single-axis subsystems arranged parallel to one another in a plane such that their magnetic sensors are disposed at the vertices of a parallelogram with the first single-axis subsystem being part of the left half of the array and the second single-axis subsystem being part of the right half of the array. Processing means coupled to the magnetic sensors generates (i) a differential total field parameter, and (ii) a gradient parameter for each of the left half and right half of the array. The differential total field parameter for the left half is defined as a sum of the total magnetic field due to the presence of a magnetic anomaly at the magnetic sensors associated with the left half. Similarly, the differential total field parameter for the right half is defined as a sum of the total magnetic field due to the presence of a magnetic anomaly at the magnetic sensors associated with the right half. The gradient parameter for the left half is defined as a sum of total magnetic field gradients for the single-axis subsystems of the left half. Similarly, the gradient parameter for the right half is defined as a sum of total magnetic field gradients for the single-axis subsystems of the right half. At least one of (i) the differential total field parameter for the left half and right half, and (ii) the gradient parameter for the left half and right half, define guidance control parameters used to steer the platform to align the platforms's direction of motion with the magnetic anomaly.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Prior to describing the present invention, a review of magnetic phenomena relevant to the design of magnetic sensor systems will be provided. Throughout this disclosure, vector quantities are denoted by boldface type and scalar quantities by normal type. In general, the design and operation of apparatuses and methods used for detection, localization and classification (DLC) of magnetically polarized objects depend on the following:

(1) The existence of vector magnetic fields $B_A$ that emanate from an object's net magnetization M. The $B_A$ fields constitute relative small, short range "magnetic anomalies" within the Earth's background field.

(2) The relatively large and locally nearly constant magnetic induction field of Earth (designated as $B_E$) that permeates all space around the planetary surface. The $B_E$ field may induce much of an object's magnetic anomaly field. However, since the relatively small target anomaly field is convolved with $B_E$, the Earth's field also complicates the process of DLC of magnetic objects using mobile sensing platforms.

The vector magnetic induction field $B_A$ of a magnetically polarized object at distances r greater than about three times the object's longest dimension is given by the well known "dipole approximation", namely, $$B_A(r)=(\mu/4\pi)[3(M \cdot r)r/r^5-M/r^3] \quad (1)$$

where $B_A(r)$ is the vector magnetic induction (in units of Tesla or "T") at a point defined by a position vector r (in units of meters or "m") relative to a vector magnetic dipole source M (in units of Amperes×meter squared or "Am$^2$"). The parameter $\mu$ is the magnetic permeability (in units of Tm/A) which is approximately equal to $4\pi \times 10^{-7}$ Tm/A for non-magnetic media.

In a Cartesian coordinate system with unit vectors i, j and k along the XYZ directions, the vectors $B_A$, r and M can be written in terms of their components or $B_A=iB_{AX}+jB_{AY}+kB_{AZ}$, $r=iX+jY+kZ$ and $M=iM_X+jM_Y+kM_Z$. The scalar magnitudes r and M, and the product M·r, respectively, can be written as $r=(X^2+Y^2+Z^2)^{0.5}$ and $M=(M_X^2+M_Y^2+M_Z^2)^{0.5}$, and $M \cdot r=M_X X+M_Y Y+M_Z Z$. Using these relationships, equation (1) can be written to explicitly represent the components of $B_A$ in terms of six independent scalar components (X,Y,Z and $M_X,M_Y,M_Z$) as:

$$B_{AX}=[(3X^2-r^2)M_X+3XYM_Y+3XZM_Z]r^{-5} \quad (2A)$$

$$B_{AY}=[3XYM_X+(3Y^2-r^2)M_Y+3YZM_Z]r^{-5} \quad (2B)$$

$$B_{AZ}=[3XZM_X+3YZM_Y+(3Z^2-r^2)M_Z]r^{-5} \quad (2C)$$

For notational convenience, the constant $(\mu/4\pi)$ has been absorbed into the dipole term M. The scalar magnitude $B_A$ is given by the square root of the sum of squares of the individual XYZ components of $B_A$ vector so that $$B_A=[(B_{AX})^2+(B_{AY})^2+(B_{AZ})^2]^{0.5} \quad (3)$$

Accurate DLC of magnetic objects requires the use of apparatus and methods that can measure and process $B_A$ field components at different points in order to determine both the XYZ coordinates of a target's position and the $M_X,M_Y,M_Z$, components of the target's dipole moment. However, direct measurements of $B_A$ are complicated by the relatively very large Earth field $B_E$ which at mid latitudes has a nearly constant magnitude $B_E$ of about 50,000 nanoTesla (nT) at the Earth's surface. Equation (1) indicates that the anomaly fields that are associated with magnetic objects decrease with the inverse cube of distance to the objects, i.e., $B_A \propto r^{-3}$. Therefore, $B_E$ is generally much larger than $B_A$ except for field points that are measured very close to the target.

The Earth's field and anomaly field vectors sum to create a total field $B_T$. Therefore, direct measurements of magnetic field actually involve measurement of a total field $B_T$ that is given by $$B_T = B_E + B_A \quad (4)$$

$$= (B_{EX} + B_{AX})i + (B_{EY} + B_{AY})j + (B_{EZ} + B_{AZ})k$$

$$= B_{TX}i + B_{TY}j + B_{TZ}k$$

The magnitude of $B_T$ or $B_T$ can be written as $$B_T=(B_{TX}^2+B_{TY}^2+B_{TZ}^2)^{0.5} \quad (5)$$

The quantity $B_T$ is a rotationally invariant scalar. Unfortunately, $B_T$ is not a robust quantity. That is, $B_T$ does not always increase as the sensor-target distance, r decreases. Unlike the quantity $B_A$, $B_T$ isn't robust because, at a given sensor-target distance in some regions in target space, the $B_E$ and $B_A$ fields point in the same direction and thereby increase the magnitude of $B_T$. However, in other regions, the $B_E$ and $B_A$ fields point in opposite directions thereby decreasing the magnitude of $B_T$. Thus, it is generally accepted in the art that $B_T$ does not provide a good basis for directly homing in on magnetic targets. However, this invention's sensor embodiments and its method of processing scalar total field quantities allow development of unique sets of scalar total field parameters that can be used to provide an improved, longer range magnetic anomaly guidance modality for directly homing in on magnetic targets.

To use $B_T$ to detect and "home in on" or localize magnetic objects from high-mobility sensing platforms, apparatus and methods are required that can detect and discriminate relatively small target signatures $B_A$ that are convolved with the Earth's field $B_E$. The detection/discrimination of components of $B_A$ usually requires sensor systems that can measure the spatial rate of change or gradient of $B_T$. The following briefly describes the theory of operation of a gradiometer applied to gradient measurements of $B_T$.

Application of the gradient operator $\nabla \equiv i\partial/\partial x + j\partial/\partial y + k\partial/\partial z$ to the scalar total field $B_T$ yields a vector-type quantity $$\nabla B_T = i\partial B_T/\partial x + j\partial B_T/\partial y + k\partial B_T/\partial z \qquad (6)$$

$$\approx i\Delta B_T/\Delta x + j\Delta B_T/\Delta y + k\Delta B_T/\Delta z$$

The finite difference elements, $\Delta B_T/\Delta x$, $\Delta B_T/\Delta y$, $\Delta B_T/\Delta z$ represent the fact that, in practice, each gradient component ($\partial B_T/\partial x$, $\partial B_T/\partial y$, $\partial B_T/\partial z$) effectively is determined by measuring the total field at spatially separate points along a sensor system's XYZ axes, subtracting the total field values at one point from the values at another point and dividing the resultant differential field values by the directed distances $\Delta X$, $\Delta Y$ or $\Delta Z$ between the points. The resulting quantities $\Delta B_T/\Delta X$, etc., represent the average gradients at the midpoint of the respective distance $\Delta X$, $\Delta Y$ or $\Delta Z$.

At sensor-target distances where the magnitude of $B_A$ is much smaller than $B_E$, the gradient of the total field actually measures the rate of change of $B_A$ in the direction of $B_E$ with respect to displacements in $\Delta X$, $\Delta Y$ or $\Delta Z$. The absolute value of $\nabla B_T$, i.e., the quantity $|\nabla B_T|$, constitutes a pseudo robust magnetic target-homing parameter that generally increases as the distance to a magnetic anomaly decreases. The total gradient magnitude is the square root of the sum of squares of the components of $\nabla B_T$ that is, $$|\nabla B_T| = [(\Delta B_T/\Delta x)^2 + (\Delta B_T/\Delta y)^2 + (\Delta B_T/\Delta z)^2]^{0.5} \qquad (7)$$

The present invention's system and method processes total field type guidance parameters to directly home in on magnetic targets. The total field type parameters can be derived from field measurements collected by sensor arrays comprised of either scalar magnetometers (SM) that only measure the scalar magnitude $B_T$ of the total field, or triaxial magnetometers (TM) that measure XYZ vector components of the vector total field $B_T$. For the longest range target detection and homing capabilities, SM sensors are preferred as they can be used to achieve a target-homing range on the order of ten times longer than the target-homing range achieved using non-cryogenic TM sensors.

SM-type sensors normally just measure the scalar magnitude of the total field $B_T$. Generally, SM sensors measure the rate of precession of electronic or atomic "spin" components around the ambient magnetic field $B_T$. For the present invention, a SM sensor should meet the following design and construction requirements:

Provide a signal output that responds to the scalar magnitude of $B_T$ at the SM sensor location in space.

Have a frequency response from DC to frequencies high enough to include the entire sensor-motion-induced frequency spectrum contained in a target's induction field.

Have sufficient sensitivity and dynamic range to effectively detect and discriminate small anomaly fields in the large background field of the earth.

Be of small physical size to allow an array of SMs to be practicably mounted on a relatively small autonomous sensing platform.

Be relatively free of "heading errors" and "dead zones" that otherwise would limit the use of SMs for high-mobility sensing platforms.

Be easily and accurately compensated for the individual differences between the sensor channels' gain and alignment in the sensor system reference frame.

Present day scalar magnetometer technology allows the above criteria to be fulfilled by a variety of SM-type sensors such as atomic vapor (e.g., cesium vapor) magnetometers, inert gas (e.g., helium) magnetometers, proton precession magnetometers, and Overhauser-type scalar magnetometers.

As is known in the art, a TM sensor has three mutually orthogonal magnetic field sensing vector axes for sensing magnetic field (i.e., B-field) components ($B_x, B_y, B_z$). The sense axis directions define a convenient and computationally efficient choice for a local (X,Y,Z) coordinate system. The design and construction requirements for TM sensors used in the present invention are as follows:

Provide a signal output that responds to the vector component of magnetic field along a single direction in space (i.e., the sensitive axis) and not respond to field components that are orthogonal to the sensitive axis.

Have a frequency response from DC to frequencies high enough to include the entire sensor-motion-induced frequency spectrum contained in a target's induction field.

Have sufficient sensitivity and dynamic range to effectively detect and discriminate small anomaly fields in the large background field of the earth.

Be of small physical size to allow a triad of sensors to be mutually configured in very close proximity as a tri-axial array with orthogonal sense axes.

Be easily and accurately compensated for the individual differences between the sensor channels' gain and alignment in the sensor system reference frame.

Present day vector magnetometer technology and recent advances in micro-electromechanical systems (MEMS) technology allows these criteria to be fulfilled by a variety of sense elements such as triaxial fluxgate magnetometers, giant magnetoresistive devices, giant magnetoimpedance devices, superconducting quantum interference (SQUID) devices and enhanced sensitivity Hall effect devices.

Figure 1:
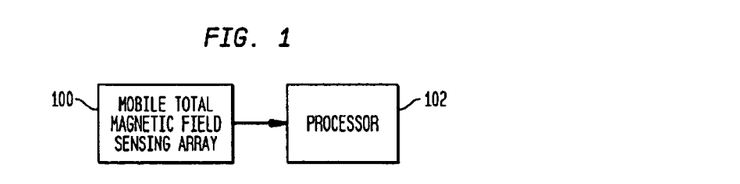
FIG. 1 is a top-level block diagram of a magnetic anomaly homing system in accordance with the present invention.

FIG. 1 is a top-level block diagram illustrating the basic system components required to carry out the homing method of the present invention. The first component is a mobile total magnetic field sensing array 100 capable of detecting either (i) the scalar magnitude of $B_T$, or (ii) the XYZ vector components of vector total field $B_T$ that can then be used to develop $B_T$. The sensed magnetic data is provided to a processor 102 that uses same to develop guidance instructions or control information. For example, if array 100 is mounted on a manually-driven vehicle, the output of processor 102 serves as navigation instructions for the vehicle's operator. For an autonomously-driven vehicle, the output of processor 102 serves as the control signals used by the vehicle's navigation system.

Figure 2:
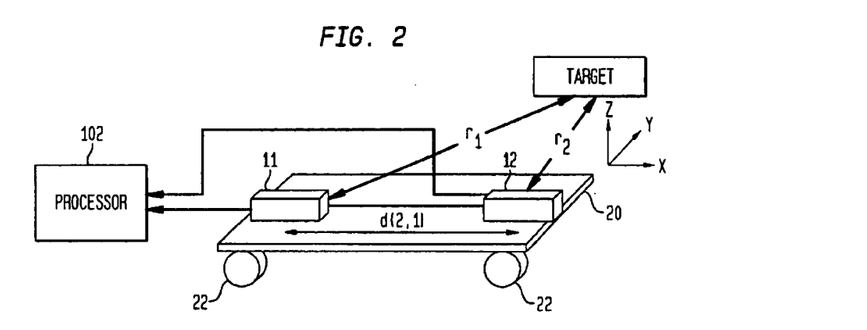
FIG. 2 is a schematic view of a single-axis total-field sensor subsystem used in the various embodiments of the present invention.

The long-range magnetic homing systems of the present invention use a novel method that is based on a number of single-axis sensor subsystems. Referring now to FIG. 2, a "single axis" sensor subsystem of the invention is defined by two magnetic total-field sensors 11 and 12 separated by a fixed distance d(2,1) on a rigid non-magnetic platform 20 having the means to make platform 20 mobile. For example, platform 20 could be mounted on (motorized) wheels 22, or other any other means for making platform 20 mobile (e.g., tracks, legs, fluid propulsion system, etc.), the choice of which is not a limitation of the present invention. Field sensors 11 and 12 can either be scalar magnetometers (SM) or vector triaxial magnetometers (TM). The invention uses processor 102 to develop an unique total field based guidance modality from the sensors' scalar total field data.

In an SM-based embodiment, sensors 11 and 12 measure the scalar total field along the direction of the Earth's field, $B_E$. The present invention's method develops total field quantities that a manually-operated or autonomous sensing platform can use to directly home in on the position of a magnetic target. The operation of a two SM sensor array axis includes the following steps:

(i) In an anomaly-free region (i.e., where $B_T = B_E$), sensors 11 and 12 directly measure the Earth's field $B_E$. The $B_E$ value is stored by processor 102.

(ii) As the sensor system is moved in search of a target, each SM measures the scalar total field at its location. Sensor 11 measures a total field $B_{T1} = |B_E + B_{A1}|$ and sensor 12 measures $B_{T2} = |B_E + B_{A2}|$.

(iii) At each position of the sensor subsystem, total field guidance parameters are developed as follows:

$B_E$ is subtracted from each $B_{Ti}$ measurement to obtain differential total field quantities $\Delta B_{T1} = B_{T1} - B_E$ and $\Delta B_{T2} = B_{T2} - B_E$;

A "differential total field" guidance parameter $T_i$ for each "i-th axis" is defined as the sum of the axis' differential total field magnitudes, i.e., processor 102 calculates the absolute value of each $\Delta B_{Ti}$ or $|B_{Ti}|$ for use in the sum. Thus, for the illustrated example, the T parameter for the axis defined by sensors 11 and 12 is $T_{(1)} = |\Delta B_{T1}| + |\Delta B_{T2}|$; and A gradient $G_{T(i)}$ between the i-th and j-th sensors of an axis is defined by $G_{T(i)} = |(\Delta B_{Tj} - \Delta B_{Ti})|/d_i = |B_{Tj} - B_{Ti}|/d_i$. In the illustrated example, $G_{T(i)} = |\Delta B_{T2} - \Delta B_{T1}|/d(2,1) = |B_{T2} - B_{T1}|/d(2,1)$. The gradient parameters $G_{T(i)}$ are required for guidance continuity in regions of target space where the T parameters may become zero as the target is approached. For multi-axis arrays such as those described later herein, the T and G parameters are combined by the invention to provide an improved total field based magnetic anomaly guidance system.

In a TM-based embodiment, the operation of a two TM sensor array axis includes the following steps:

(i) Each of sensors 11 and 12 measures XYZ components of vector magnetic field $B_T$ at its respective location. Specifically, at a distance $r_1$ from a target, sensor 11 measures $B_{TX1}$, $B_{TY1}$ and $B_{TZ1}$, while at $r_2$ sensor 12 measures $B_{TX2}$, $B_{TY2}$ and $B_{TZ2}$.

(ii) Processor 102 calculates total field magnitudes $B_{Tj}$ for each TM sensor. For sensor 11, $$B_{T1} = [(B_{X1})^2 + (B_{Y1})^2 + (B_{Z1})^2]^{0.5}$$

and for sensor 12

$$B_{T2} = [(B_{TX2})^2 + (B_{TY2})^2 + (B_{TZ2})^2]^{0.5}$$

(iii) In an anomaly-free region (i.e., where $B_T = B_E$), the sensors measure the Earth's field $B_E$.

(iv) As the sensor system is moved in search of a target, a scalar total field $B_{Ti}$ is developed for each sensor. Sensor 11 data is used to develop a total field $B_{T1} = |B_E + B_{A1}|$, and sensor 12 data is used to develop a total field $$B_{T2} = |B_E + B_{A2}|.$$

(v) Sensor processor 102 develops total field guidance parameters as follows:

$B_E$ is subtracted from each $B_{Ti}$ to obtain $\Delta_{BT1} = B_{T1} - B_E$ and $\Delta B_{T2} = B_{T2} - B_E$;

The absolute value of each $\Delta B_{Ti}$ is taken, i.e., processor 102 calculates $|B_{T1}|$ and $|\Delta B_{T2}|$;

A "differential total field" guidance parameter Ti for each i-th axis is defined as the sum of the axis' differential total field magnitudes. For the illustrated example, the T parameter for the axis defined by sensors 11 and 12 is $$T_1 = |\Delta B_{T1}| + |\Delta B_{T2}|; \text{ and}$$

A gradient $G_{T(i)}$ between the i-th and j-th sensors of an axis is defined by $G_{T(i)} = |\Delta B_{Tj} - \Delta B_{Ti}|/d_i = |B_{Tj} - B_{Ti}|/d_i$. In the illustrated example, $G_{T(1)} = |\Delta B_{T2} - \Delta B_{T1}|/d(2,1) = |B_{T2} - B_{T1}|/d(2,1)$.

Three or more sensors can be used to construct homing systems that utilize processing methods based upon the above-described single-axis subsystem. For example, three field sensors can be arranged (i) equally spaced along a line that is transverse to the array's motion, (ii) in a triangular plane that is bisected by a geometric axis of mirror symmetry aligned with the array's motion. The differential total field parameters T and gradient parameters G are compared for the two axes that are mirror-imaged about an axis of symmetry that is generally aligned with the sensor array's direction of motion. Inequalities between the axes' T parameters and inequalities between the axes' G parameters serve as guidance corrections, whereas equality between the axes' T parameters and equality between the axes' G parameters indicate that the array is headed straight for the magnetic target. However, in general, the three-sensor embodiments of the present invention cannot develop fully efficient total field guidance. Accordingly, it is preferred that at least four field sensors be used to implement the long-range homing methodology of the present invention.

Figure 3:
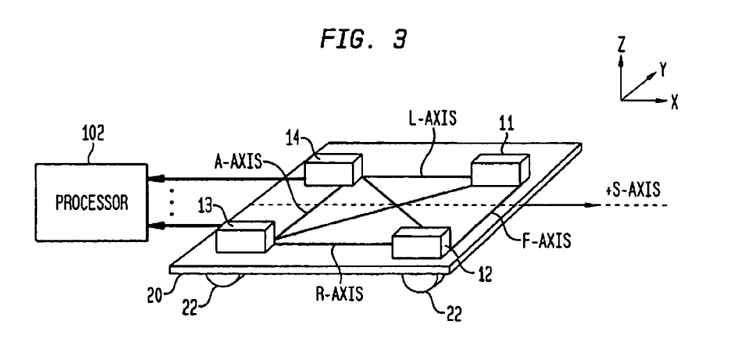
FIG. 3 is a schematic view of a horizontal array of four total-field sensors in accordance with an embodiment of the present invention.

FIG. 3 illustrates a horizontal array of four total field sensors 11–14 located at the vertices of a rectangular parallelogram. The sensors lie in an XY plane of motion where the +S-Axis (bisecting the parallelogram) defines the system's forward direction of motion. This configuration allows the use of up to six combinations of pairs of sensors (i.e., "axes") to provide total field guidance parameters for homing in on a magnetic anomaly field. Four of the sensor system's axes are defined by the perimeter of the parallelogram. Specifically, sensors 11 and 14 define a left Primary Guidance Axis (PGA) or "L-Axis" as it is referenced in FIG. 3, and sensors 12 and 13 define the right PGA or "R-Axis". The fore axis ("F-Axis") defined by sensors 11 and 12, and the aft axis ("A-Axis") defined by sensors 13 and 14, can be used to develop transverse data. In a manner similar to that described above, B-field data are collected by each sensor and processor 102 develops total field guidance parameters for each axis. By way of illustrative example, a square array of side length "d" will be assumed so that the following guidance parameters are developed:

$T_R=|B_{T2}-B_E|+|B_{T3}-B_E|,$ $T_L=|B_{T1}-B_E+B_{T4}-B_E|,$ $G_{TR}=|B_{T2}-B_{T3}|/d,$ and $G_{TL}=|B_{T1}-B_{T4}|/d.$ For this embodiment, $G_{TR}$ and $G_{TL}$ provide "longitudinal" gradient type guidance parameters along the forward direction of sensor platform motion.

With additional reference now to the flowchart in FIG. 4, the homing process using total field scalars in accordance with the present invention will now be described for the sensor system illustrated in FIG. 3. At step 200, the sensor system is moved (i.e., manually or autonomously) in an area and the above-defined total-field T and G parameters are calculated/determined using the data collected by sensors 11–14. The total-field T and G parameters are compared to pre-determined threshold values at step 202. If the thresholds are not met for either the T or G parameters, processing returns to step 200 where the sensor system continues to move and search. If thresholds are met for the T parameters, step 204 compares $T_R$ and $T_L$ where $T_R=T_L$ indicates that the sensor array (moving in the direction of the +S-Axis) is heading toward the magnetic target, $T_R>T_L$ indicates that the sensor array should be turned to the right, and $T_R<T_L$ indicates that the sensor array should be turned to the left.

If the thresholds are not met for the T parameters but are met for the G parameters (i.e., as could be the case when a target is approached), step 206 compares $G_{TR}$ and $G_{TL}$ where $G_{TR}=G_{TL}$ indicates that the sensor array (moving in the direction of the +S-Axis) is heading toward the magnetic target, $G_{TR}>G_{TL}$ indicates that the sensor array should be turned to the right, and $G_{TR}<G_{TL}$ indicates that the sensor array should be turned to the left.

In addition, $G_{TF}$ and $G_{TA}$ can be calculated/determined to provide "transverse" gradient type guidance parameters that can be compared to determine target position relative to the fore and aft sections of the sensor platform. Specifically, after determining $G_{TF}=|B_{T2}-B_{T1}|/d,$ and $G_{TA}=|B_{T4}-B_{T3}|/d,$ comparisons therebetween are used to indicate if the sensor system should move in the direction of the +S-Axis (i.e., $G_{TF}>G_{TA}$) or the –S-Axis (i.e., $G_{TF}<G_{TA}$).

Finally, parameters can be developed and used to provide an indication of the relative position of a target with respect to the "diagonals" of the sensor array. That is, for the diagonal defined by sensors 11 and 13, $G_{TD}(3,1)=|B_{T1}-B_{T3}|/d(3,1),$ while for the diagonal defined by sensors 12 and 14, $G_{TD}(4,2)=|B_{T2}-B_{T4}|/d(4,2)$ The T and G parameters described above can be provided to and used by an operator of a manually-steered vehicle in making manual steering adjustments. The T and G parameters could also be used by an autonomous vehicle's navigation system to automatically make the necessary steering adjustments to home in on a target. The homing process continues until the target is contacted or until a "target located" threshold (e.g., a G parameter threshold) is achieved.

Using the above indicated guidance parameters, the planar four sensor embodiment provides two-dimensional guidance for directly homing in on magnetic targets. However, the two-dimensional embodiment is limited with regard to its ability to provide target homing data related to the three-dimensional components or "depth" of a magnetic anomaly field. In order to increase the robustness and power of the invention's total field guidance method, three-dimensional sensor array embodiments, such as those shown in FIGS. 5–8, can be designed to exploit the symmetries and dimensionality of the total magnetic anomaly field.

The rationale for increasing the number of sensor elements and the dimensionality of an array is that the robustness and target-homing efficiency of the invention's scalar magnetic anomaly guidance approach increases as the number of sensors and dimensionality increase. This is because (i) in general, the guidance signal strength developed by a sum of positive scalar terms increases as the number terms increases, (ii) the robustness of the sum of contributions from a distribution of sensors increases as the spatial volume of the distribution increases, and (iii) the robustness of a set of guidance parameters increases as the number of spatial dimensions represented (or sampled) by the guidance parameters increases.

Figure 5:
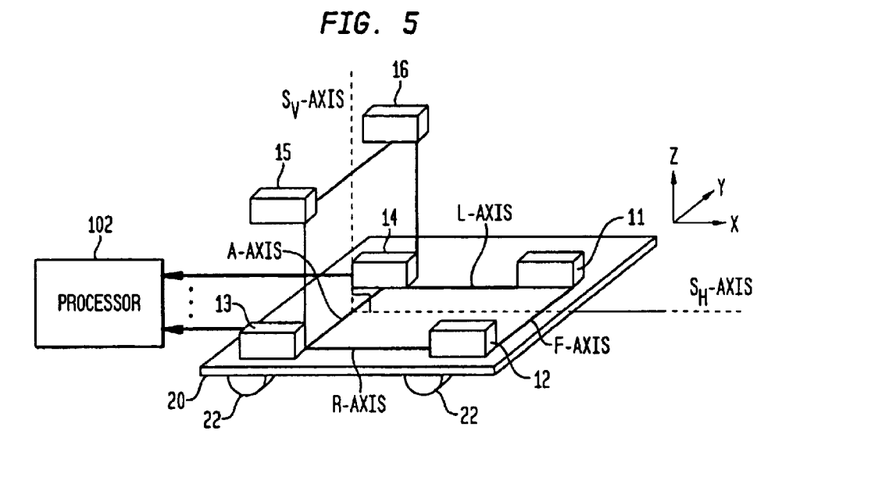
FIG. 5 is a schematic view of a three-dimensional array of six total-field sensors in accordance with another embodiment of the present invention.

Referring now to FIG. 5, an array of six sensors 11–16 is illustrated with sensors 11–14 being located at the vertices of a horizontal rectangular parallelogram, while sensors 13–16 comprise a vertically mounted parallelogram so that the parallelograms are perpendicular to one another. This configuration allows significantly improved guidance and target classification capabilities for homing in on a magnetic anomaly field. In particular, this embodiment develops more robust guidance parameters in the longitudinal and transverse directions with respect to the symmetry plane defined by the $S_H$ and $S_V$ axes. Sensors 11, 14 and 16 comprise a left "guidance plane" and sensors 12, 13 and 15 comprise a right guidance plane. In addition, sensors 11, 13, 14 and 16 comprise a left triaxial orthogonal guidance array (TOGA), while sensors 12–15 comprise the right TOGA. Data from the TOGAs are used to develop more robust differential total field ($T_i$) data and "total" total field gradient information ($T_{Gi}$) that allow this embodiment to provide a significantly improved level of robustness for target localization or homing.

In a manner similar to that described above, B-field data are collected by each sensor and the processor develops total field-based guidance parameters for each axis and plane of the array. For notational convenience, in the following, the distances between pairs of sensors along the XYZ directions are taken to be equal, that is, $d(2,1)=d(3,2)=d(5,3)=d(4,3)=d(4,1)=d(6,4)=d(6,5)\equiv d$. Specifically, the following guidance parameters are developed:

$T_R=|B_{T2}-B_E|+|B_{T3}-B_E|+|B_{T5}-B_E|,$ $T_L=|B_{T1}-B_E|+|B_{T4}-B_E|+|B_{T6}-B_E|,$ $G_{TR}=|B_{T2}-B_{T3}|/d+|B_{T5}-B_{T3}|/d=|B_{T5}-B_{T2}|/d\sqrt{2},$ $G_{TL}=|B_{T1}-B_{T4}|/d+|B_{T6}-B_{T4}|/d=|B_{T6}-B_{T1}|/d\sqrt{2},$ $G_{TF}=|B_{T1}-B_{T2}|/d,$ $G_{TA}=|B_{T4}-B_{T3}|/d,$ $$T_{GR}=[(B_{T2}-B_{T3})^2+(B_{T4}-B_{T3})^2+(B_{T5}-B_{T3})^2]^{0.5}/d, \text{ and}$$

$$T_{GL}=[(B_{T1}-B_{T4})^2+(B_{T3}-B_{T4})^2+(B_{T6}-B_{T4})^2]^{0.5}/d$$

Note that the right and left TOGAs share a common axis, namely the d(4,3) axis. This sharing of a common axis somewhat reduces the comparative left-right guidance efficiency of the TOGAS. Also, as in the horizontal plane sensor system of FIG. 3 1 secondary guidance parameters associated with the diagonal axes (i.e., axes defined by sensors 11 and 13, sensors 12 and 14, etc.) can also be developed.

Figure 4:
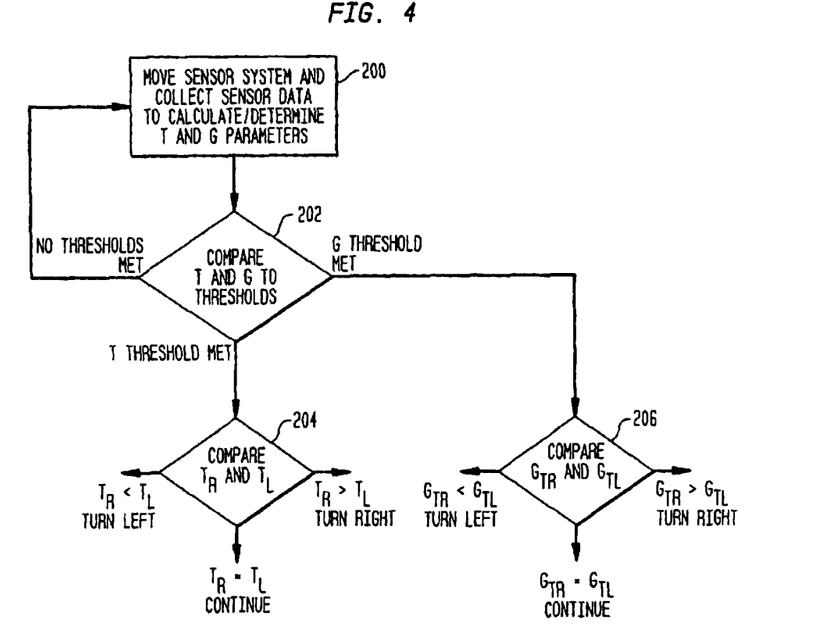
FIG. 4 is a flow diagram of the steps used to home in on a magnetic target in accordance with the present invention.

The process of using the above-developed parameters to home in on a magnetic target is similar to that described in FIG. 4. The additional "total" total field gradient information ($T_{GR}$ and $T_{GL}$) developed from the TOGAs provides a more robust and analytically better-defined quantity for target localization that can be used whenever their magnitudes exceed their detection and guidance thresholds.

In summary, there are three types of total field guidance parameters uniquely developed by the invention. Each type of guidance parameter can have its particular detection/guidance threshold and priority in a guidance parameter hierarchy. The three types are as follows:

(i) Relatively long-range differential total field-type guidance parameters $T_R$ and $T_L$. These basically correspond to sums of the component of a magnetic anomaly's (i.e., a target) signature that is parallel to the Earth's field. The sums are taken from the individual sensors on the right (R) and left (L) sides of the sensor array. The $T_R$ and $T_L$ parameters change as the inverse cube of distance to the target. In some regions they may go to zero as the target is approached.

(ii) Relatively short-range total field gradient parameter $G_{TR}$ and $G_{TL}$. These correspond to the sums of differences of total field that are measured by "axes" (i.e., sets of two sensors) on the R and L sides of the sensor array. The $G_{TR}$ and $G_{TL}$ parameters change as the inverse fourth power of distance to the target.

(iii) Relatively short-range total—total field gradient parameters $T_{GR}$ and $T_{GL}$. These correspond to the square root of the sums of squares of differences of total field that are measured by triaxial orthogonal guidance arrays (TOGA), i.e., sets of four sensors on the right and left sides of the sensor array. Similar to the $G_{TR}$ and $G_{TL}$ parameters, the $T_{GR}$ and $T_{GL}$ parameters change as the inverse fourth power of distance to the target. The advantage of using $T_{GR}$ and $T_{GL}$ parameters is that they are well-defined and robust parameters that always increase as the target is approached. Therefore, for an SM-based system when the $T_{GR}$ and $T_{GL}$ parameters are above their detection/guidance threshold, use of these parameters constitutes a preferred guidance modality.

Figure 6:
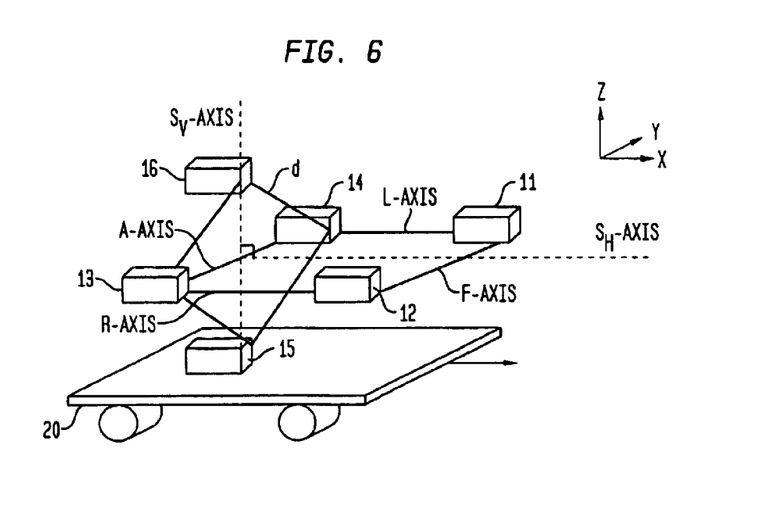
FIG. 6 is a schematic view of a three-dimensional array of six total-field sensors in accordance with yet another embodiment of the present invention.

Illustrated in FIG. 6 is another six sensor embodiment that possesses certain inherent advantages over the embodiment shown in FIG. 5. Sensors 13–16 are preferably arranged in a square (of side "d") defining a plane that is parallel to the system Y-Z plane. A diagonal of the square, defined by sensors 15 and 16, is mounted parallel to the system's Z-Axis. Sensors 11–14 define a rectangle defining a plane that is parallel to the system's X-Y plane. A right triaxial orthogonal guidance array (TOGA) comprised by sensors 12, 13, 15 and 16 and a left TOGA comprised by sensors 11, 14, 15 and 16 have no shared axes and thus provide an improved and wider triangulation baseline compared to the TOGA-baseline of FIG. 5. For notational convenience, the distances between pairs of sensors along the axes indicated by solid lines are taken to be equal so that d(4,1)=d(6,4)=d(4,5)=d(6,3)=d(3,5)=d(3,2)=d.

In a manner similar to that described above, B-field data are collected by each sensor and the processor develops the following total field-based guidance parameters for each axis, plane and TOGA of the array:

$$T_R=|B_{T2}-B_E|+|B_{T3}-B_E|,$$

$$T_L=|B_{T1}-B_E|+|B_{T4}-B_E|,$$

$$G_{TR}=|B_{T2}-B_{T3}|/d+|B_{T6}-B_{T3}|/d+|B_{T3}-B_{T5}|/d,$$

$$G_{TL}=|B_{T1}-B_{T4}|/d+|B_{T6}-B_{T4}|/d+|B_{T4}-B_{T5}|/d,$$

$$G_{TF}=|B_{T2}-B_{T1}|/d\sqrt{2},$$

$$G_{TA}=|B_{T4}-B_{T3}|/d\sqrt{2},$$

$$T_{GR}=[(B_{T2}-B_{T3})^2+(B_{T3}-B_{T5})^2+(B_{T6}-B_{T3})^2]^{0.5}/d, \text{ and}$$

$$T_{GL}=[(B_{T1}-B_{T4})^2+(B_{T4}-B_{T5})^2+(B_{T6}-B_{T4})^2]^{0.5}/d.$$

Figure 7:
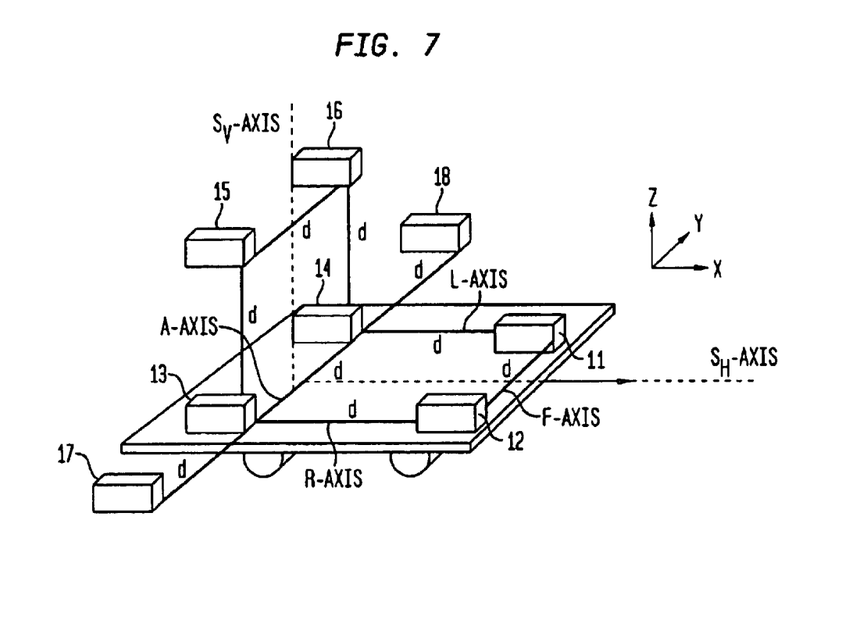
FIG. 7 is a schematic view of a three-dimensional array of eight total-field sensors in accordance with another embodiment of the present invention.

An eight sensor embodiment illustrated in FIG. 7 provides a relatively wide baseline for two spatially separate triaxial orthogonal guidance arrays (TOGA). Sensors 12, 13, 15 and 17 comprise a right TOGA, and sensors 11, 14, 16 and 19 comprise a left TOGA separated a distance d(1,2) from the right TOGA. Since d(1,2) can be quite large, the triangulation baseline of this arrangement can provide relatively robust two-dimensional total field guidance parameters for underwater bottom vehicles or land-based vehicles.

In a manner similar to that described above, B-field data are taken by each sensor and the processor develops the following total field-based guidance parameters that correspond to each axis, plane and TOGA of the array:

$$T_R=|B_{T2}-B_E|+|B_{T3}-B_E|+|B_{T5}-B_E|+|B_{T7}-B_E|,$$

$$T_L=|B_{T1}-B_E|+|B_{T4}-B_E|+|B_{T6}-B_E|+|B_{T8}-B_E|,$$

$$G_{TR}=|B_{T2}-B_{T3}|/d+|B_{T5}-B_{T3}|/d+|B_{T7}-B_{T3}|/d+|B_{T5}-B_{T2}|/d\sqrt{2}+|B_{T7}-B_{T5}|/d\sqrt{2}+|B_{T7}-B_{T2}|/d\sqrt{2},$$

$$G_{TL}=|B_{T2}-B_{T4}|/d+|B_{T6}-B_{T4}|/d+|B_{T8}-B_{T4}|/d+|B_{T8}-B_{T1}|/d\sqrt{2}+|B_{T8}-B_{T6}|/d\sqrt{2}+|B_{T6}-B_{T1}|/d\sqrt{2},$$

$$G_{TF}=|B_{T1}-B_{T2}|/d,$$

$$G_{TA}=|B_{T4}-B_{T3}|/d,$$

$$T_{GR}=[(B_{T2}-B_{T3})^2+(B_{T5}-B_{T3})^2+(B_{T3}-B_{T7})^2]^{0.5}/d, \text{ and}$$

$$T_{GL}=[(B_{T1}-B_{T4})^2+(B_{T8}-B_{T4})^2+(B_{T6}-B_{T4})^2]^{0.5}/d.$$

Figure 8:
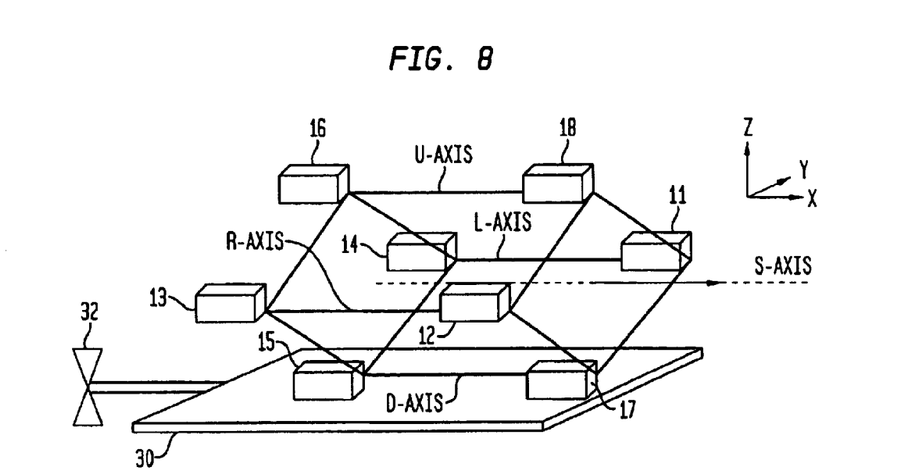
FIG. 8 is a schematic view of a parallelepiped array of eight total-field sensors in accordance with another embodiment of the present invention.

FIG. 8 illustrates a more symmetrical three-dimensional array of eight sensors arranged in a parallelepiped array that provides a more robust three-dimensional target homing capability. This embodiment is obtained by adding an axis defined by sensors 17 and 18 such that it is parallel to the axis defined by sensors 15 and 16 of FIG. 6. As a result, an upper or U-Axis defined by sensors 16 and 18 is located above and parallel to the parallelogram formed by sensors 11–14. Similarly, a lower or D-Axis defined by sensors 15 and 17 is located beneath and parallel to the parallelogram formed by sensors 11–14. Furthermore, forward and aft upper TOGAs can be defined by sensors 11, 12, 16 and 18 and 13, 14, 16 and 18, respectively, while forward and aft lower TOGAs can be defined by sensors 11, 12, 15 and 17 and 13, 14, 15 and 17, respectively. Using the methods described above, the differential total field T parameters, gradient G parameters and total gradient $T_G$ parameters can be developed for the U-Axis and the D-Axis. Thus, this embodiment allows development of three-dimensional total field guidance parameters to control a free-swimming sensing platform 30 (equipped with a propulsion system 32) in right (R) and left (L) directions as described above, as well as up (U) and down (D) directions (relative to the plane defined by sensors 11–14) as it homes in on a magnetic target. Free-swimming sensing platform 30 can be any one of a variety of autonomous vehicle designs equipped with a navigation system (not shown) that will navigate using the various types of guidance parameters developed by the present invention. Accordingly, it is to be understood that the type of autonomous vehicle and its navigation system are not limitations of the present invention.

The advantages of the present invention are numerous. The method and systems described herein provide improved, longer range magnetic anomaly detection, guidance and target homing capability. The magnetic homing systems and method of this invention can be used by manually-steered or autonomously-steered robotic vehicles for detection and localization of ferrous objects such as underwater and buried mines. In practical use, a human operator or robotic vehicle would move the sensor in a search pattern that scans for magnetic targets. When a target is within the sensor's detection range, target detection and guidance signals are generated that indicate the direction of the target relative to the sensor system. The guidance signals can then be used to home in on the magnetic target. The embodiments of the invention can be used to provide two or three-dimensional magnetic guidance for manually-operated or autonomous vehicles moving on land or crawling/swimming underwater. This sensor concept is applicable to a wide variety of commercial and military uses where improved and practical magnetic guidance capabilities can be used to precisely localize and contact magnetic targets. The following list includes some important applications:

Mine countermeasures applications involving the detection, localization and classification of magnetic mines on land or underwater.

Localization and tracing of subterranean pipes and cables.

Localization of military targets, e.g., tanks by providing magnetic guidance to small, unmanned robotic vehicles.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A magnetic anomaly homing system, comprising:
    a non-magnetic platform;
    an array of magnetic sensors coupled to said platform and arranged to define a left half of said array and a right half of said array relative to a direction of motion of said platform, said array defined by a plurality of single-axis subsystems with each one thereof having two of said magnetic sensors spaced apart from one another, said plurality of single-axis subsystems including at least first and second single-axis subsystems arranged parallel to one another in a plane such that said magnetic sensors are disposed at the vertices of a parallelogram with said first single-axis subsystem being part of said left half of said array and said second single-axis subsystem being part of said right half of said array; and
    processing means coupled to said magnetic sensors for generating (i) a differential total field parameter for each of said left half and said right half of said array, said differential total field parameter for said left half defined as a sum of the total magnetic field due to the presence of a magnetic anomaly at said magnetic sensors associated with said left half, and said differential total field parameter for said right half defined as a sum of the total magnetic field due to the presence of a magnetic anomaly at said magnetic sensors associated with said right half, and (ii) a gradient parameter for each of said left half and said right half of said array, said gradient parameter for said left half defined as a sum of total magnetic field gradients for said plurality of single-axis subsystems of said left half, and said gradient parameter for said right half defined as a sum of total magnetic field gradients for said plurality of single-axis subsystems of said right half, wherein at least one of (i) said differential total field parameter for said left half and said right half, and (ii) said gradient parameter for said left half and said right half, define guidance control parameters used to steer said platform to align said direction of motion with the magnetic anomaly.

2. A magnetic anomaly homing system as in claim 1 wherein said parallelogram is a square.

3. A magnetic anomaly homing system as in claim 1 wherein said non-magnetic platform is an autonomous vehicle that uses said guidance control parameters in autonomous navigation thereof.

4. A magnetic anomaly homing system as in claim 1 wherein each of said magnetic sensors comprises a scalar magnetometer.

5. A magnetic anomaly homing system as in claim 1 wherein each of said magnetic sensors comprises a triaxial magnetometer.

6. A magnetic anomaly homing system as in claim 1 wherein said plurality of single-axis subsystems further includes third and fourth single-axis subsystems that are parallel to one another with said third single-axis subsystem (i) sharing one of said magnetic sensors from said first single-axis subsystem, (ii) being p art of said left half, and (iii) arranged perpendicular to said first single-axis subsystem, and with said fourth single-axis subsystem (i) sharing one of said magnetic sensors from said second single-axis subsystem, (ii) being part of said right half, and (iii) arranged perpendicular to said second single-axis subsystem, wherein a fifth single-axis subsystem is defined by said one of said magnetic sensors from said first single-axis subsystem so-shared in combination with said one of said magnetic sensors from said second single-axis subsystem so-shared, wherein said magnetic sensors in first, third and fifth single-axis subsystems define a left triaxial orthogonal guidance array (TOGA), and wherein said magnetic sensors in said second, fourth and fifth single-axis subsystems define a right triaxial orthogonal guidance array (TOGA), said processing means further generating a total field gradient parameter for each of said left TOGA and said right TOGA, said total field gradient parameter for said left TOGA defined as the square root of a sum of squares of differences in total field between said magnetic sensors of said first, third and fifth single-axis subsytems, and said total field gradient parameter for said right TOGA defined as the square root of a sum of squares of differences in total field between said magnetic sensors of said second, fourth and fifth single-axis subsytems, wherein at least one of (i) said differential total field parameter for said left half and said right half, (ii) said gradient parameter for said left half and said right half, and (iii) said total field gradient parameter for said left TOGA and said right TOGA, define guidance control parameters used to steer said platform to align said direction of motion with the magnetic anomaly.

7. A magnetic anomaly homing system as in claim 1 wherein said plurality of single-axis subsystems further includes third and fourth single-axis subsystems that are parallel to one another with said third single-axis subsystem (i) sharing one of said magnetic sensors from said first single-axis subsystem, (ii) being part of said left half, and (iii) arranged perpendicular to said first single-axis subsystem, and with said fourth single-axis subsystem (i) sharing one of said magnetic sensors from said second single-axis subsystem, (ii) being part of said right half, and (iii) arranged perpendicular to said second single-axis subsystem, wherein said plurality of single-axis subsystems further includes fifth and sixth single-axis subsystems with said fifth single-axis subsystem (i) sharing one of said magnetic sensors from said first single-axis subsystem, (ii) being part of said left half, and (iii) arranged perpendicular to each of said first and third single-axis subsystems, and with said sixth single-axis subsystem (i) sharing one of said magnetic sensors from said second single-axis subsystem, (ii) being part of said right half, and (iii) arranged perpendicular to each of said second and fourth single-axis subsystems, wherein said magnetic sensors in first, third and fifth single-axis subsystems define a left triaxial orthogonal guidance array (TOGA), and wherein said magnetic sensors in said second, fourth and sixth single-axis subsystems define a right triaxial orthogonal guidance array (TOGA), said processing means further generating a total field gradient parameter for each of said left TOGA and said right TOGA, said total field gradient parameter for said left TOGA defined as the square root of a sum of squares of differences in total field between said magnetic sensors of said first, third and fifth single-axis subsytems, and said total field gradient parameter for said right TOGA defined as the square root of a sum of squares of differences in total field between said magnetic sensors of said second, fourth and sixth single-axis subsytems, wherein at least one of (i) said differential total field parameter for said left half and said right half, (ii) said gradient parameter for said left half and said right half, and (iii) said total field gradient parameter for said left TOGA and said right TOGA, define guidance control parameters used to steer said platform to align said direction of motion with the magnetic anomaly.

8. A magnetic anomaly homing system as in claim 1 wherein said plurality of single-axis subsystems further includes third and fourth single-axis subsystems that are parallel to one another with said third single-axis subsystem (i) sharing one of said magnetic sensors from said first single-axis subsystem, and (ii) being part of said left half, and with said fourth single-axis subsystem (i) sharing one of said magnetic sensors from said second single-axis subsystem, and (ii) being part of said right half, wherein said plurality of single-axis subsystems further includes fifth and sixth single-axis subsystems with said fifth single-axis subsystem (i) sharing one of said magnetic sensors from said first single-axis subsystem, (ii) being part of said left half, and (iii) arranged perpendicular to said third single-axis subsystem, and with said sixth single-axis subsystem (i) sharing one of said magnetic sensors from said second single-axis subsystem, (ii) being part of said right half, and (iii) arranged perpendicular to said fourth single-axis subsystem, wherein said magnetic sensors in first, third and fifth single-axis subsystems define a left triaxial orthogonal guidance array (TOGA), and wherein said magnetic sensors in said second, fourth and sixth single-axis subsystems define a right triaxial orthogonal guidance array (TOGA), said processing means further generating a total field gradient parameter for each of said left TOGA and said right TOGA, said total field gradient parameter for said left TOGA defined as the square root of a sum of squares of differences in total field between said magnetic sensors of said first, third and fifth single-axis subsytems, and said total field gradient parameter for said right TOGA defined as the square root of a sum of squares of differences in total field between said magnetic sensors of said second, fourth and sixth single-axis subsytems, wherein at least one of (i) said differential total field parameter for said left half and said right half, (ii) said gradient parameter for said left half and said right half, and (iii) said total field gradient parameter for said left TOGA and said right TOGA, define guidance control parameters used to steer said platform to align said direction of motion with the magnetic anomaly.

9. A magnetic anomaly homing system as in claim 1 wherein said plurality of single-axis subsystems further includes third and fourth single-axis subsystems that are parallel to one another with said third single-axis subsystem disposed above and parallel to said plane of said parallelogram, and with said fourth single-axis subsystem disposed beneath and parallel to said plane of said parallelogram, wherein said magnetic sensors of said array are positioned at the vertices of a parallelepiped with said third single-axis subsystem defining an upper axis of said array and said fourth single-axis subsystem defining a lower axis of said array, said processing means further generating (i) a differential total field parameter for each of said upper axis and said lower axis of said array, said differential total field parameter for said upper axis defined as a sum of the total magnetic field due to the presence of a magnetic anomaly at said magnetic sensors associated with said upper axis, and said differential total field parameter for said lower axis defined as a sum of the total magnetic field due to the presence of a magnetic anomaly at said magnetic sensors associated with said lower axis, and (ii) a gradient parameter for each of said upper axis and said lower axis of said array, said gradient parameter for said upper axis defined as a total magnetic field gradient for said upper axis, and said gradient parameter for said lower axis defined as a total magnetic field gradient for said lower axis, wherein at least one of (i) said differential total field parameter for said upper axis and said lower axis, and (ii) said gradient parameter for said upper axis and said lower axis, define guidance control parameters used to steer said platform up and down relative to said plane of said parallelogram to align said direction of motion with the magnetic anomaly.

10. A method of homing in on a magnetic anomaly, comprising the steps of:

providing an array of magnetic sensors coupled to a non-magnetic platform and arranged to define a left half of said array and a right half of said array relative to a direction of motion of said platform, said array defined by a plurality of single-axis subsystems with each one thereof having two of said magnetic sensors spaced apart from one another, said plurality of single-axis subsystems including at least first and second single-axis subsystems arranged parallel to one another in a plane such that said magnetic sensors are disposed at the vertices of a parallelogram with said first single-axis subsystem being part of said left half of said array and said second single-axis subsystem being part of said right half of said array;

moving said platform with said array coupled thereto along said direction of motion;

generating a differential total field parameter for each of said left half and said right half of said array while said platform is moving, said differential total field parameter for said left half defined as a sum of the total magnetic field due to the presence of a magnetic anomaly at said magnetic sensors associated with said left half, and said differential total field parameter for said right half defined as a sum of the total magnetic field due to the presence of a magnetic anomaly at said magnetic sensors associated with said right half;

generating a gradient parameter for each of said left half and said right half of said array while said platform is moving, said gradient parameter for said left half defined as a sum of total magnetic field gradients for said plurality of single-axis subsystems of said left half, and said gradient parameter for said right half defined as a sum of total magnetic field gradients for said plurality of single-axis subsystems of said right half; and steering said platform using guidance control parameters to align said direction of motion with the magnetic anomaly, said guidance control parameters defined by at least one of (i) said differential total field parameter for said left half and said right half, and (ii) said gradient parameter for said left half and said right half.

11. A method according to claim 10 wherein said parallelogram is a square.

12. A method according to claim 10 wherein said plurality of single-axis subsystems further includes third and fourth single-axis subsystems that are parallel to one another with said third single-axis subsystem (i) sharing one of said magnetic sensors from said first single-axis subsystem, (ii) being part of said left half, and (iii) arranged perpendicular to said first single-axis subsystem, and with said fourth single-axis subsystem (i) sharing one of said magnetic sensors from said second single-axis subsystem, (ii) being part of said right half, and (iii) arranged perpendicular to said second single-axis subsystem, wherein a fifth single-axis subsystem is defined by said one of said magnetic sensors from said first single-axis subsystem so-shared in combination with said one of said magnetic sensors from said second single-axis subsystem so-shared, wherein said magnetic sensors in first, third and fifth single-axis subsystems define a left triaxial orthogonal guidance array (TOGA), and wherein said magnetic sensors in said second, fourth and fifth single-axis subsystems define a right triaxial orthogonal guidance array (TOGA), said method further comprising the steps of:

generating a total field gradient parameter for each of said left TOGA and said right TOGA, said total field gradient parameter for said left TOGA defined as the square root of a sum of squares of differences in total field between said magnetic sensors of said first, third and fifth single-axis subsytems, and said total field gradient parameter for said right TOGA defined as the square root of a sum of squares of differences in total field between said magnetic sensors of said second, fourth and fifth single-axis subsytems; and steering said platform using an enhanced set of guidance control parameters to align said direction of motion with the magnetic anomaly, said enhanced set of guidance control parameters defined by at least one of (i) said differential total field parameter for said left half and said right half, (ii) said gradient parameter for said left half and said right half, and (iii) said total field gradient parameter for said left TOGA and said right TOGA.

13. A method according to claim 10 wherein said plurality of single-axis subsystems further includes third and fourth single-axis subsystems that are parallel to one another with said third single-axis subsystem (i) sharing one of said magnetic sensors from said first single-axis subsystem, (ii) being part of said left half, and (iii) arranged perpendicular to said first single-axis subsystem, and with said fourth single-axis subsystem (i) sharing one of said magnetic sensors from said second single-axis subsystem, (ii) being part of said right half, and (iii) arranged perpendicular to said second single-axis subsystem, wherein said plurality of single-axis subsystems further includes fifth and sixth single-axis subsystems with said fifth single-axis subsystem (i) sharing one of said magnetic sensors from said first single-axis subsystem, (ii) being part of said left half, and (iii) arranged perpendicular to each of said first and third single-axis subsystems, and with said sixth single-axis subsystem (i) sharing one of said magnetic sensors from said second single-axis subsystem, (ii) being part of said right half, and (iii) arranged perpendicular to each of said second and fourth single-axis subsystems, wherein said magnetic sensors in first, third and fifth single-axis subsystems define a left triaxial orthogonal guidance array (TOGA), and wherein said magnetic sensors in said second, fourth and sixth single-axis subsystems define a right triaxial orthogonal guidance array (TOGA), said method further comprising the steps of:

generating a total field gradient parameter for each of said left TOGA and said right TOGA, said total field gradient parameter for said left TOGA defined as the square root of a sum of squares of differences in total field between said magnetic sensors of said first, third and fifth single-axis subsytems, and said total field gradient parameter for said right TOGA defined as the square root of a sum of squares of differences in total field between said magnetic-sensors of said second, fourth and sixth single-axis subsytems; and steering said platform using an enhanced set of guidance control parameters to align said direction of motion with the magnetic anomaly, said enhanced set of guidance control parameters defined by at least one of (i)

said differential total field parameter for said left half and said right half, (ii) said gradient parameter for said left half and said right half, and (iii) said total field gradient parameter for said left TOGA and said right TOGA.

14. A method according to claim 10 wherein said plurality of single-axis subsystems further includes third and fourth single-axis subsystems that are parallel to one another with said third single-axis subsystem (i) sharing one of said magnetic sensors from said first single-axis subsystem, and (ii) being part of said left half, and with said fourth single-axis subsystem (i) sharing one of said magnetic sensors from said second single-axis subsystem, and (ii) being part of said right half, wherein said plurality of single-axis subsystems further includes fifth and sixth single-axis subsystems with said fifth single-axis subsystem (i) sharing one of said magnetic sensors from said first single-axis subsystem, (ii) being part of said left half, and (iii) arranged perpendicular to said third single-axis subsystem, and with said sixth single-axis subsystem (i) sharing one of said magnetic sensors from said second single-axis subsystem, (ii) being part of said right half, and (iii) arranged perpendicular to said fourth single-axis subsystem, wherein said magnetic sensors in first, third and fifth single-axis subsystems define a left triaxial orthogonal guidance array (TOGA), and wherein said magnetic sensors in said second, fourth and sixth single-axis subsystems define a right triaxial orthogonal guidance array (TOGA), said method further comprising the steps of:

generating a total field gradient parameter for each of said left TOGA and said right TOGA, said total field gradient parameter for said left TOGA defined as the square root of a sum of squares of differences in total field between said magnetic sensors of said first, third and fifth single-axis subsytems, and said total field gradient parameter for said right TOGA defined as the square root of a sum of squares of differences in total field between said magnetic sensors of said second, fourth and sixth single-axis subsytems; and steering said platform using an enhanced set of guidance control parameters to align said direction of motion with the magnetic anomaly, said enhanced set of guidance control parameters defined by at least one of (i) said differential total field parameter for said left half and said right half, (ii) said gradient parameter for said left half and said right half, and (iii) said total field gradient parameter for said left TOGA and said right TOGA.

15. A method according to claim 10 wherein said plurality of single-axis subsystems further includes third and fourth single-axis subsystems that are parallel to one another with said third single-axis subsystem disposed above and parallel to said plane of said parallelogram, and with said fourth single-axis subsystem disposed beneath and parallel to said plane of said parallelogram, wherein said magnetic sensors of said array are positioned at the vertices of a parallelepiped with said third single-axis subsystem defining an upper axis of said array and said fourth single-axis subsystem defining a lower axis of said array, said method further comprising the steps of:

generating a differential total field parameter for each of said upper axis and said lower axis of said array, said differential total field parameter for said upper axis defined as a sum of the total magnetic field due to the presence of a magnetic anomaly at said magnetic sensors associated with said upper axis, and said differential total field parameter for said lower axis defined as a sum of the total magnetic field due to the presence of a magnetic anomaly at said magnetic sensors associated with said lower axis;

generating a gradient parameter for each of said upper axis and said lower axis of said array, said gradient parameter for said upper axis defined as a total magnetic field gradient for said upper axis, and said gradient parameter for said lower axis defined as a total magnetic field gradient for said lower axis; and steering said platform up and down relative to said plane of said parallelogram using up/down guidance control parameters to align said direction of motion with the magnetic anomaly, said up/down guidance control parameters defined by at least one of (i) said differential total field parameter for said upper axis and said lower axis, and (ii) said gradient parameter for said upper axis and said lower axis.

\* \* \* \* \*